(12) United States Patent
Chiang

(10) Patent No.: US 7,032,881 B1
(45) Date of Patent: Apr. 25, 2006

(54) SWITCH MECHANISM FOR A PNEUMATIC TOOL

(75) Inventor: Hua Chiang, Taichung (TW)

(73) Assignee: Basso Industry Corp., Taichung (TW)

( * ) Notice: Subject to any disclaimer, the term of this patent is extended or adjusted under 35 U.S.C. 154(b) by 0 days.

(21) Appl. No.: 10/978,062

(22) Filed: Oct. 28, 2004

(51) Int. Cl.
*F16K 31/00* (2006.01)

(52) U.S. Cl. .................. 251/263; 251/229; 173/169

(58) Field of Classification Search ............ 251/262, 251/263, 229; 173/169
See application file for complete search history.

(56) References Cited

U.S. PATENT DOCUMENTS

| | | | | |
|---|---|---|---|---|
| 2,362,608 A | * | 11/1944 | Allen | 251/229 |
| 3,443,646 A | * | 5/1969 | Baker et al. | 173/169 |
| 4,113,080 A | * | 9/1978 | Thackston et al. | 192/150 |
| 4,258,799 A | * | 3/1981 | Eckman | 173/169 |
| 4,462,282 A | * | 7/1984 | Biek | 81/57.11 |
| 4,484,871 A | * | 11/1984 | Adman et al. | 418/69 |
| 4,485,698 A | * | 12/1984 | Adman et al. | 81/57.11 |
| 4,522,269 A | * | 6/1985 | Adman et al. | 173/177 |
| 4,631,012 A | * | 12/1986 | Eckman | 418/70 |
| 4,778,015 A | * | 10/1988 | Jacobsson | 173/169 |
| 5,083,619 A | * | 1/1992 | Giardino et al. | 173/93 |
| 5,205,540 A | * | 4/1993 | Clapp | 251/339 |
| 5,346,024 A | * | 9/1994 | Geiger et al. | 173/221 |
| 5,439,332 A | * | 8/1995 | Spitznagel | 408/84 |
| 5,531,279 A | * | 7/1996 | Biek | 173/178 |
| 5,544,710 A | * | 8/1996 | Groshans et al. | 173/176 |
| 5,788,219 A | * | 8/1998 | Nakajima | 251/339 |
| 5,913,370 A | * | 6/1999 | Chapelle et al. | 173/169 |
| 5,918,686 A | * | 7/1999 | Izumisawa | 173/20 |
| 5,992,539 A | * | 11/1999 | Lin | 173/93 |
| 6,027,099 A | * | 2/2000 | Pusateri | 251/339 |
| 6,443,239 B1 | * | 9/2002 | Izumisawa | 173/169 |
| 6,796,386 B1 | * | 9/2004 | Izumisawa et al. | 173/93.5 |
| 6,880,645 B1 | * | 4/2005 | Izumisawa | 173/93.5 |
| 6,935,437 B1 | * | 8/2005 | Izumisawa | 173/93 |

* cited by examiner

*Primary Examiner*—J. Casimer Jacyna
(74) *Attorney, Agent, or Firm*—Charles E. Baxley

(57) ABSTRACT

A switch mechanism for a pneumatic tool comprises a choke ring having an air hole disposed in an air passage of the pneumatic tool; A control rod is swayably inserted through the air hole with a first end of corresponds to a trigger of the pneumatic tool; A choke member is provided for insertion of a second end of the control rod and pushed by a spring to seal the choke ring. A bushing is disposed in an air passage and located between the choke member and the inner wall of the air passage of the base body and between the choke member and the choke ring. By such arrangement, the inner wall of the air passage of the base body and the choke ring can be avoided from being abraded by the choke member.

6 Claims, 7 Drawing Sheets

SWITCH MECHANISM FOR A PNEUMATIC TOOL

BACKGROUND OF THE INVENTION

1. Field of the Invention

This invention relates to a pneumatic tool, and more particularly to a switch mechanism for a pneumatic tool.

2. Description of the Prior Arts

All pneumatic tools are equipped with a switch mechanism that is actuated by trigger to allow the air enter the inside of the pneumatic tool to perform pneumatic operation. The switch mechanism is an indispensable part of the pneumatic tool, which has many different structural forms. The motivation of the present invention is to develop a switch mechanism that will not damage the base body of the pneumatic tool, and part of the switch mechanism is easy to be replaced after it is worn or broken.

As shown in FIGS. 1 and 2, a conventional switch mechanism for a pneumatic tool generally includes a choke ring 12, a control rod 13 and a choke member 14. The choke ring 12 is fixed in an air passage 11 of a base body 10 of the pneumatic tool, and an air hole 121 is formed at the center of the choke ring 12. The control rod 13 is swayably inserted through the air hole 121 of the choke ring 12 with a first end of the control rod 13 corresponds to a trigger 15 of the pneumatic tool and a first end of which is inserted in a choke member 14. The choke member 14 is provided around the outer periphery thereof with a choke portion 141 that is pushed by a spring 16 and to seal the choke ring 12. When the pneumatic tool is in use, the choke portion 141 of the choke member 14 is pushed by the spring 16 to seal the air hole 121 of the choke ring 12, so that the air in the air passage 11 of the base body 10 is unable to enter the inside of the base boy via the air hole 121 of the choke ring 12. As shown in FIG. 3, if the user presses the trigger 15, the control rod 13 will be pushed by the trigger 15 to sway an angle and the choke portion 141 of the choke member 1 will disengage from the air hole 121 of the choke ring 12. At this moment, air is allowed to enter the base body through the air hole 121 of the choke ring 12. This conventional switch mechanism still has some disadvantages that are explained as follows:

First, in operation, the trigger 15 pushes the control rod 13 to make it sway an angle and synchronously make the choke member 14 sway an angle too. Since there is no any component arranged between the choke member 14 and the choke ring 12, and between the choke member 14 and the inner wall of the air passage 11 of the base body 10. The choke portion 141 of the choke member 14 directly contacts the choke ring 12 and the air passage 11 of the base body 10. After a certain time of use, the choke ring 12 and the inner wall of the air passage 11 of the base body 10 will be worn or broken due to different hardness of the respective components.

Second, once the choke ring 12 is worn or broken, not only the choke ring 12 and the choke member 14 will lose their air-tightness, but also the choke ring 12 will be difficult to be replaced since it is preset in the air passage 11 of the base body 10.

The present invention has arisen to mitigate and/or obviate the afore-described disadvantages of the conventional switch of a pneumatic tool.

SUMMARY OF THE INVENTION

The primary object of the present invention is to provide a switch mechanism for a pneumatic tool which is capable of preventing abrasion and broken of the inner wall of the air passage of the base body and the choke ring.

The secondary object of the present invention is to provide a switch mechanism for a pneumatic tool that can enable the user to replace the worn or broke component of the switch mechanism with ease.

A switch mechanism for a pneumatic tool in accordance with the present invention comprises:

A choke ring is disposed in an air passage of the pneumatic took and at a center of the choke ring is formed an air hole;

A control rod is swayably inserted through the air hole of the choke ring in a manner that a first end of the control rod corresponds to a trigger of the pneumatic tool;

A choke member is provided for insertion of a second end of the control rod and pushed by a spring to seal the choke ring with an end surface.

The characteristic of the present invention is that in the air passage of the base body is disposed a bushing which is located in between the choke member and the inner wall of the air passage of the base body and between the choke member and the choke ring. By such arrangement, the inner wall of the air passage of the base body and the choke ring can be avoided from being abraded by the choke member.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
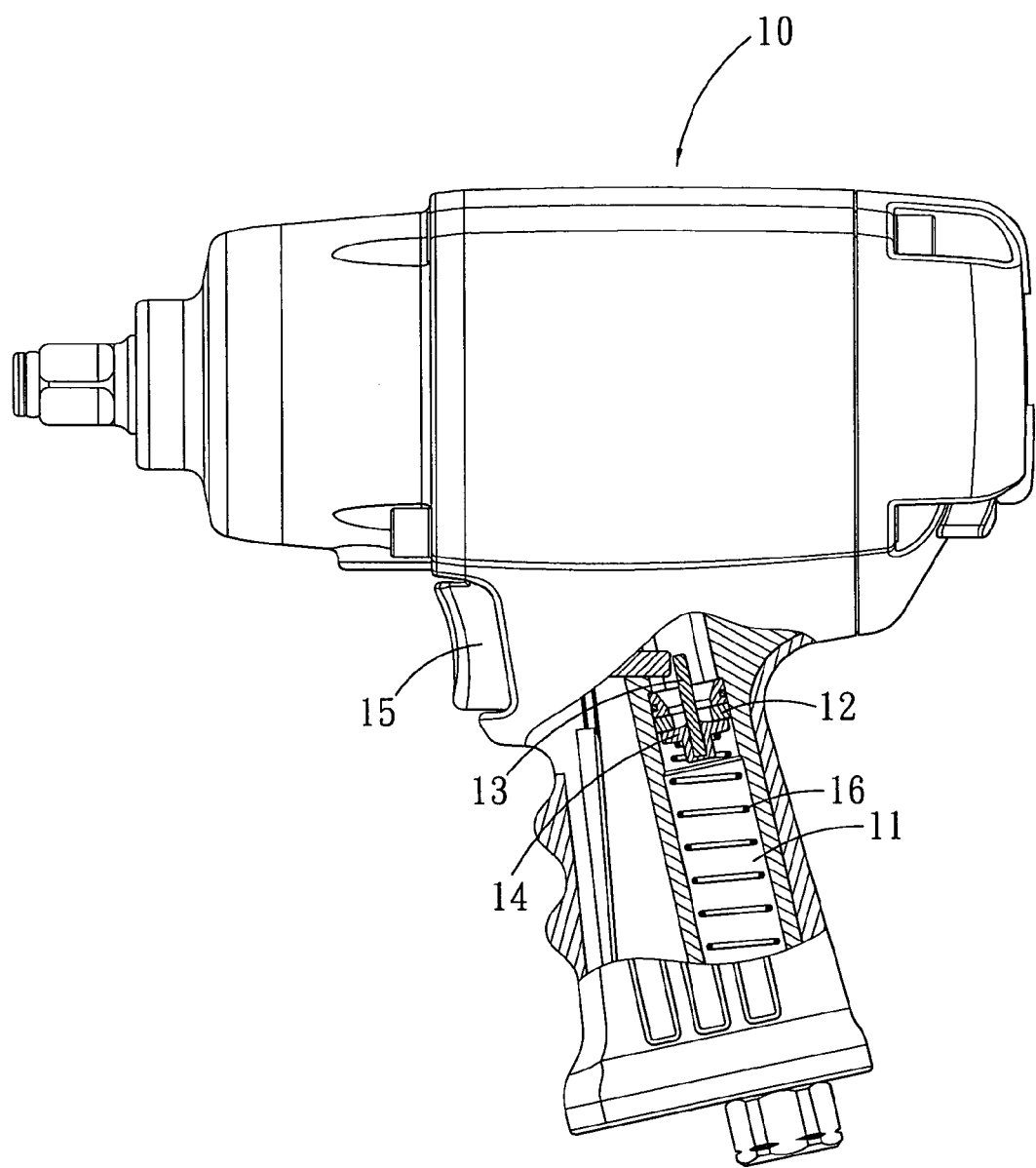
FIG. 1 is an assembly cross sectional view of a conventional switch mechanism for a pneumatic tool.
Figure 2:
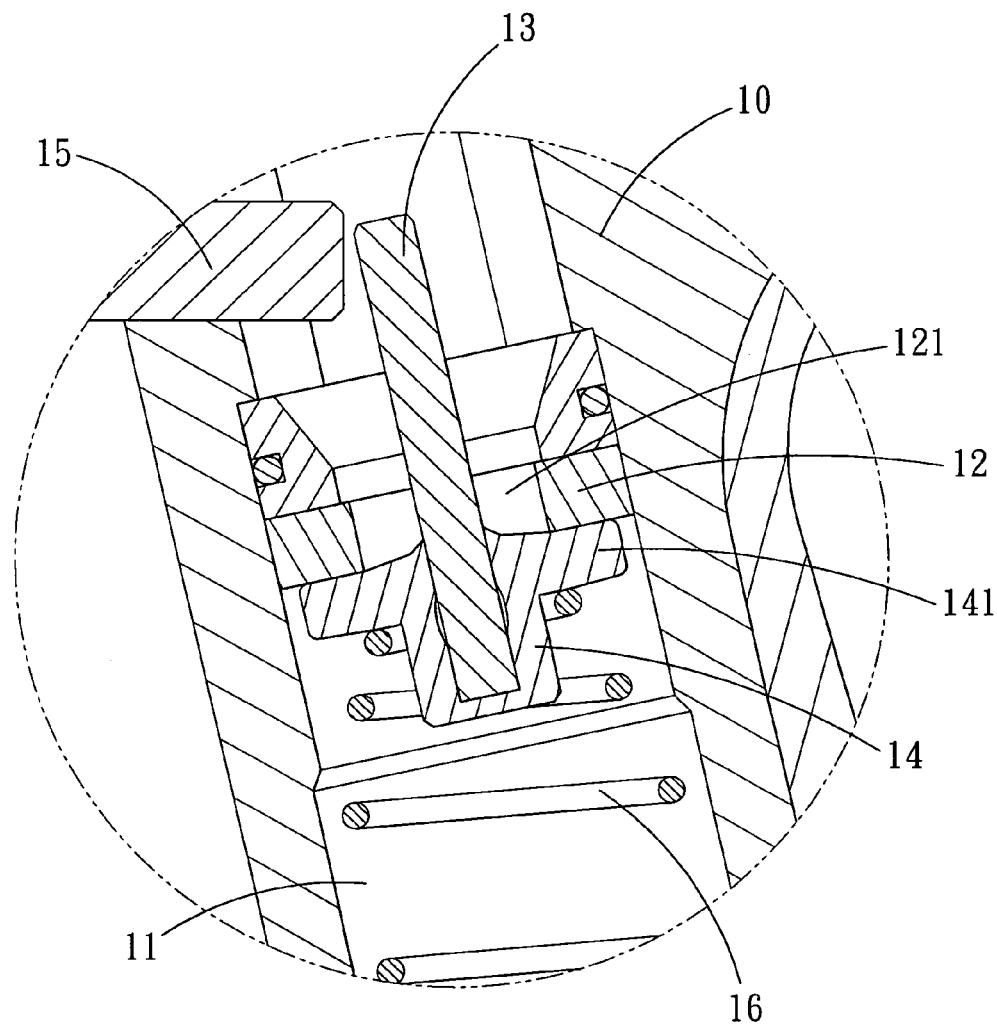
FIG. 2 is a partial amplified view of FIG. 1.
Figure 3:
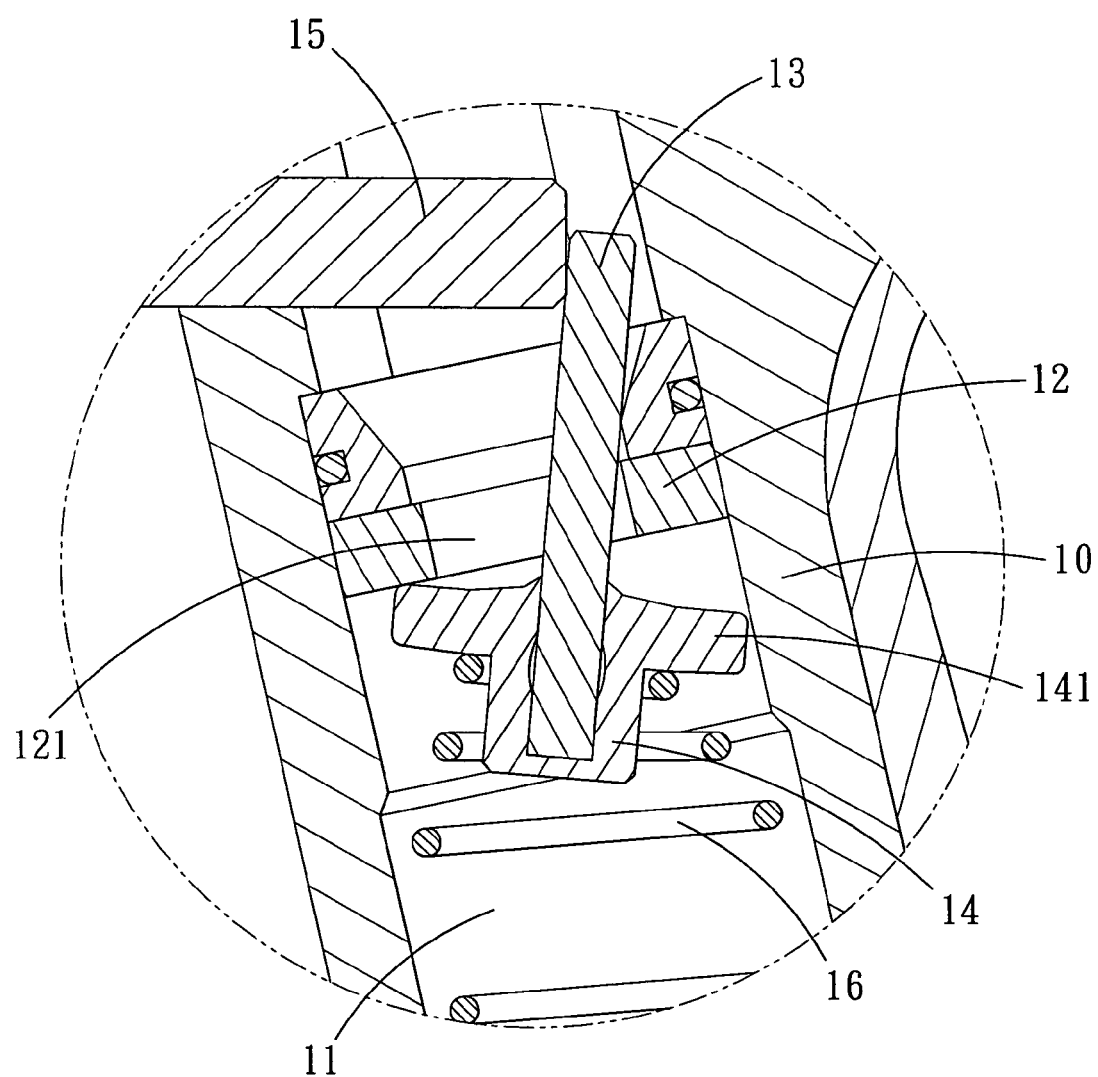
FIG. 3 is an operational view of the conventional switch mechanism for a pneumatic tool of FIG. 1.
Figure 4:
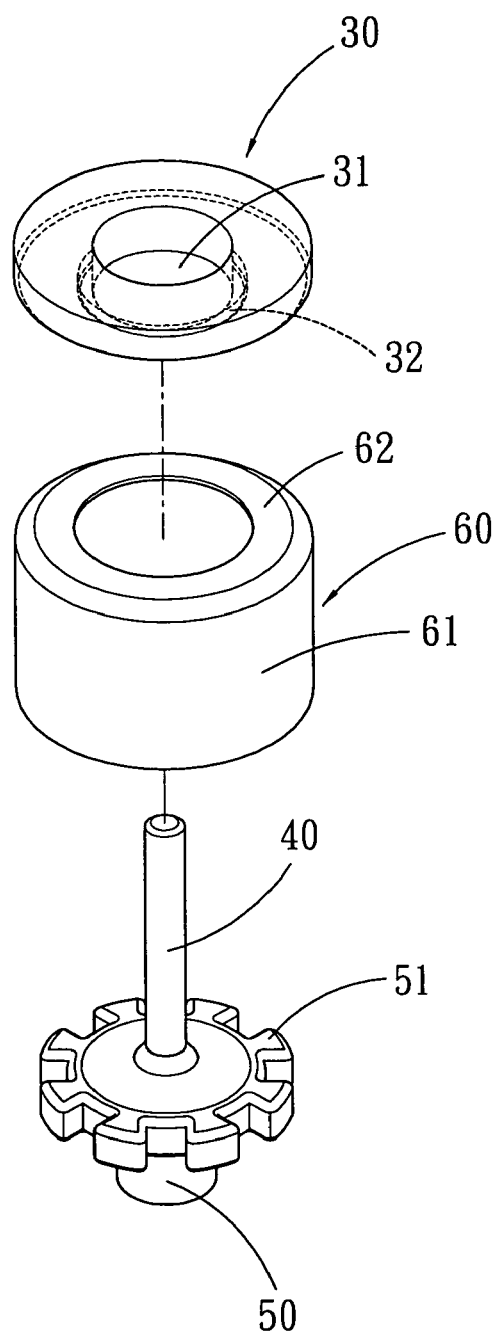
FIG. 4 is an exploded view of a switch mechanism for a pneumatic tool in accordance with the present invention.
Figure 5:
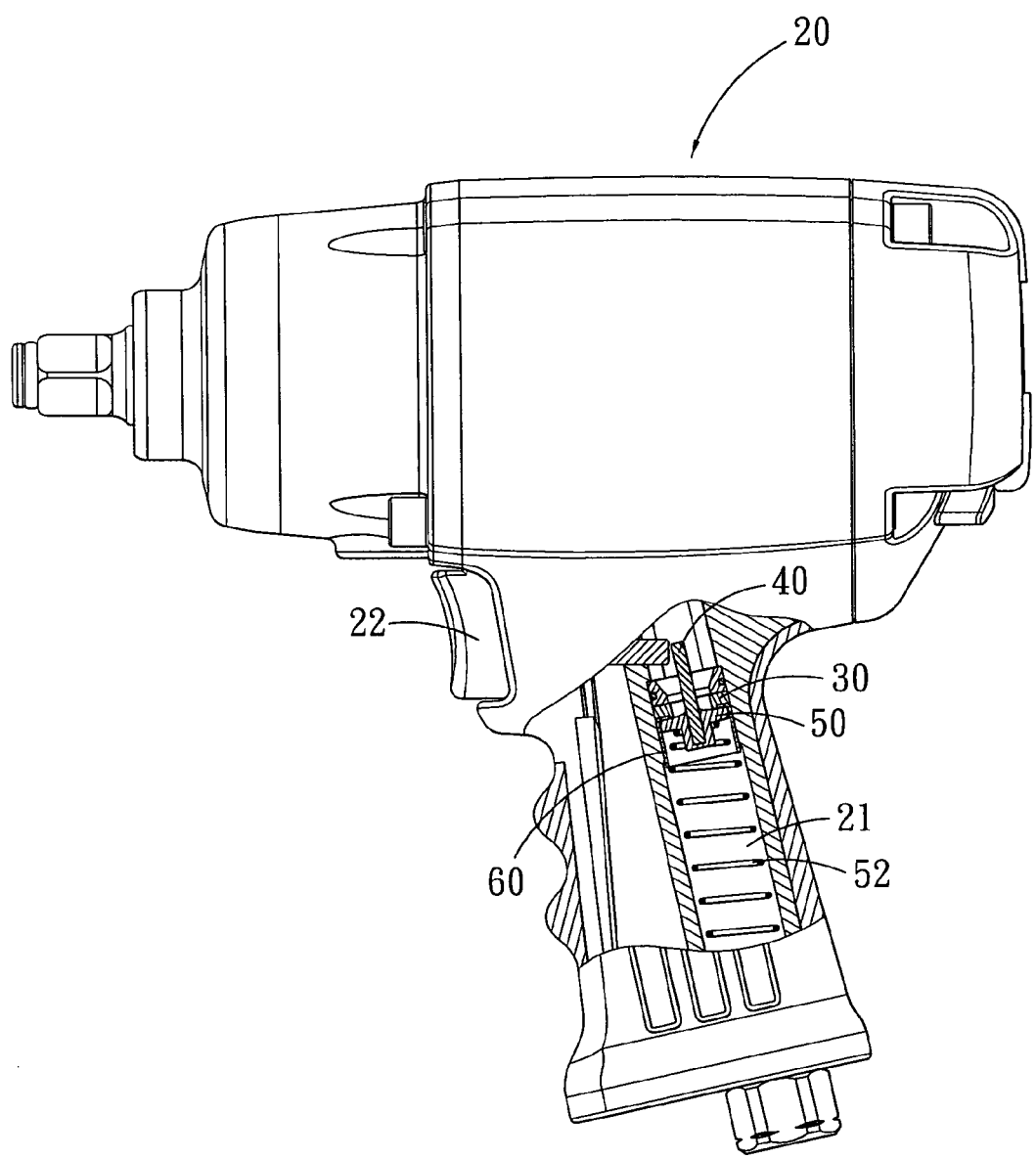
FIG. 5 is an assembly cross sectional view of the switch mechanism for a pneumatic tool in accordance with the present invention.
Figure 6:
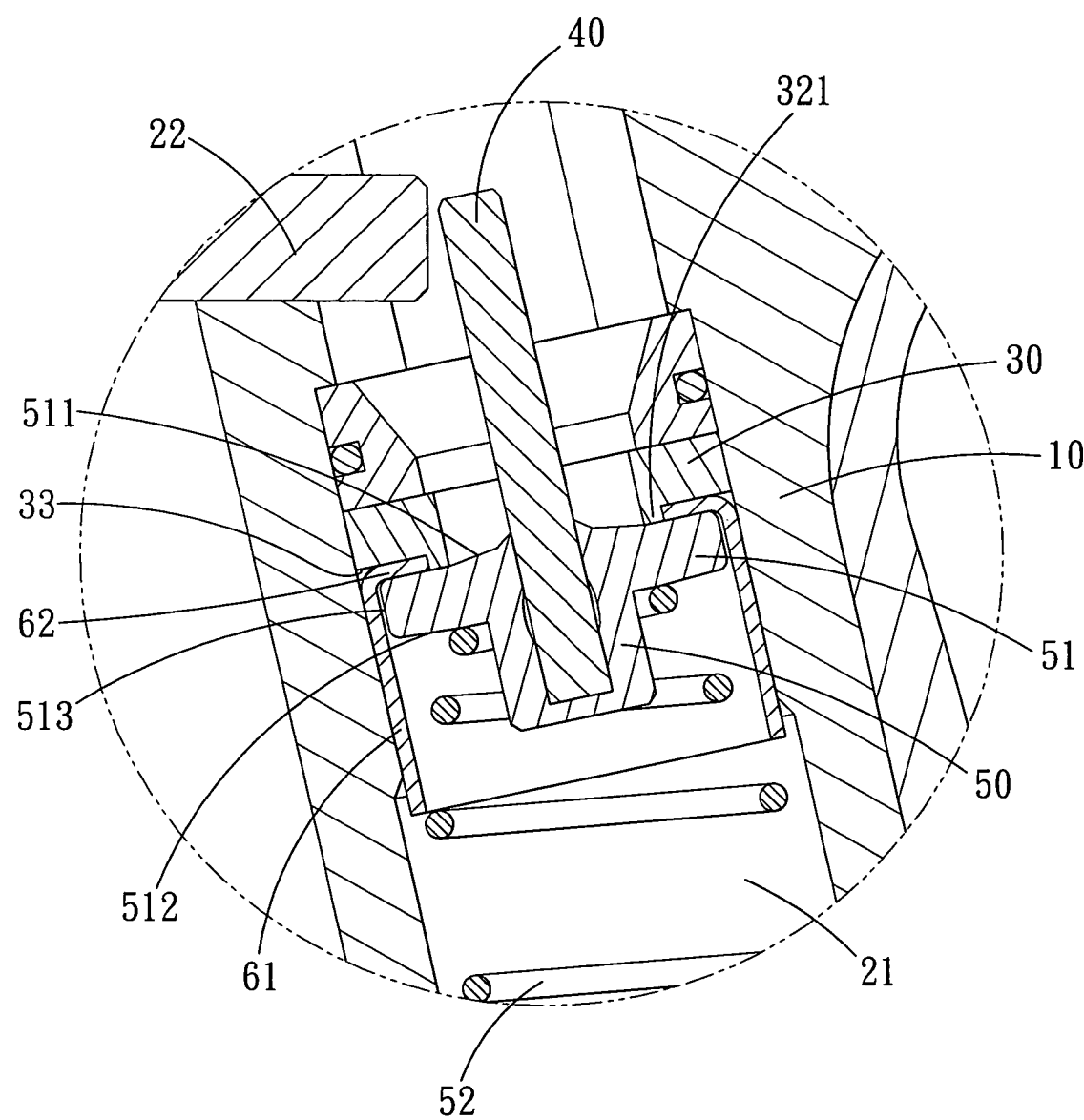
FIG. 6 is a partial amplified view of FIG. 5.

Referring to FIGS. 4–6, a switch mechanism in accordance with one aspect of the present invention is shown and generally comprises: a choke ring 30, a control rod 40, a choke member 50 and a bushing 60. The switch mechanism is disposed in a base body 20 of a pneumatic tool.

The choke ring 30 is formed with a central air hole 31 and disposed inside an air passage 21 of the base body 20. It is to be noted that an annular protrusion 32 is formed downward about the periphery of the air hole 31.

The control rod 40 is swayably inserted through the air hole 31 of the choke ring 30 in a manner that a first end of the control rod 40 corresponds to a trigger 22 of the base body 20.

The choke member 50 is provided for insertion of a second end of the control rod 40, and about the periphery of the choke member 50 is formed with a choke portion 51. A spring 52 is used to push against a lower end surface 511 of the choke portion 51, so that an upper end surface 511 of the choke 51 is pushed to seal the air hole 31 of the choke ring 30.

The specialty of the present invention is that in the air passage 21 of the base body 20 is installed with a metal-made bushing 60 whose hardness is greater than the hardness of the choke member 50. The bushing 60 has an annular abutting portion 61 and an annular shoulder portion 62 located at an end of the annular abutting portion 61. The annular abutting portion 61 is used to abut against the inner wall of the air passage 21 of the base body 20 and located between the inner wall of the air passage 21 and annular periphery 513 of the choke portion 51 of the choke member 50. The annular shoulder portion 62 is located between the upper end surface 511 of the choke portion 51 of the choke member 50 and a lower end surface 33 of the choke ring 30. The inner periphery of the annular shoulder portion 62 is abutted by the annular protrusion 32 of the choke ring 30, so that the lower end 321 of the annular shoulder 32 of the choke ring 30 is able to closely abut against the upper end surface 511 of the choke member 51 of the choke member 50.

Figure 7:
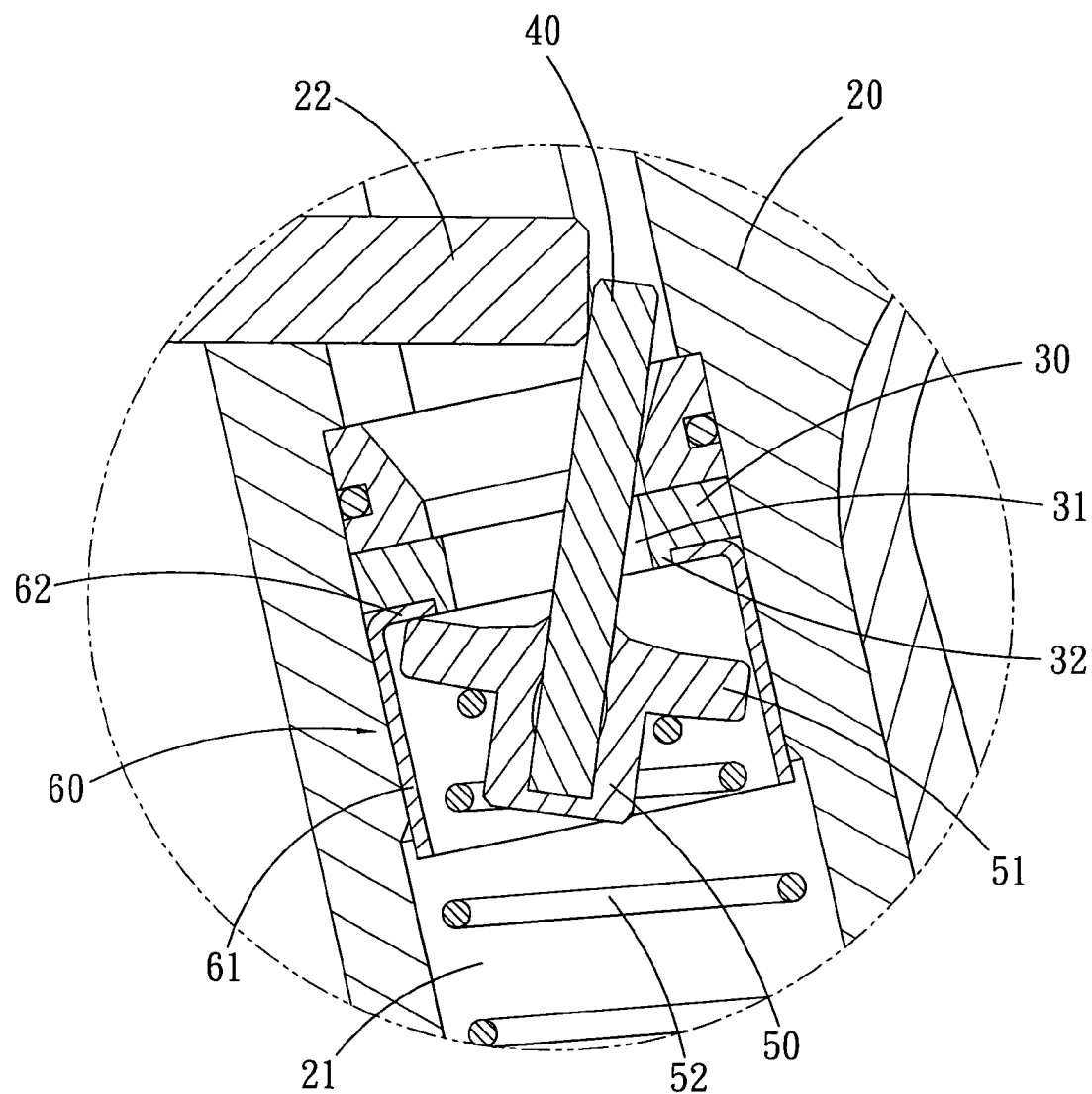
FIG. 7 is an operational view of the switch mechanism for a pneumatic tool in accordance with the present invention.

Referring to FIG. 7, when the switch mechanism is in use, the user can press the trigger 22 on the base body 20, such that the control rod 40 is moved to swing an angle by the trigger 22 and synchronously enables the choke portion 51 of the choke member 50 to disengage from the annular protrusion 32 and the air hole 31 of the choke ring 30. At this moment, air is allowed to enter the base body 20 for pneumatic operation via the air hole 31 of the choke member 30. In addition, the control rod 40 also enables the choke member 50 to swing an angle when being pushed by the trigger 22. Since the bushing 60 is disposed between the choke member 50 and the base body 20, and between the choke member 50 and the choke ring 30. After the choke member 50 swings an angle, the choke portion 51 of which will press against the annular abutting portion 61 and the annular shoulder portion 62 of the bushing 60 instead of pressing directly against the inner wall of the air passage 21 of the base body 20 and the choke ring 30. Thereby, the inner wall of the air passage 21 of the base body 20 and the choke ring 30 can be avoided from abrasion or broken.

Furthermore, the hardness of the bushing 60 is greater than that of the choke member 50, the choke portion 51 of the choke member 50 will be worn after long time of abutting against the bushing 60. However, the choke member 50 is positioned inside the air passage 21 of the base body 20 by the spring 52, and the spring 52 is detachably disposed in the air passage 21 of the base body 20. In this case, it is easy for user to replace the choke member 50 after it is worn or broken.

While we have shown and described various embodiments in accordance with the present invention, it should be clear to those skilled in the art that further embodiments may be made without departing from the scope of the present invention.

What is claimed is:

1. A switch mechanism for a pneumatic tool comprising:
   a choke ring disposed in an air passage of a pneumatic tool, at a center of the choke ring formed with an air hole;
   a control rod swayably inserted through the air hole of the choke ring, and a first end of the control rod corresponds to a trigger of the pneumatic tool;
   a choke member provided for insertion of a second end of the control rod, the choke member pushed by a spring so that the choke ring is sealed by an end surface of the choke member;
   wherein a bushing is provided in the air passage of the base body and located between the choke member and inner wall of the air passage of the base body, and between the choke member and the choke ring, so as to prevent the inner wall of the air passage of the base body and the choke ring from being worn or abraded by the choke member.

2. The switch mechanism for a pneumatic tool as claimed in claim 1, wherein the bushing has annular abutting portion, and an annular shoulder portion that is formed at an end surface of the annular abutting portion, the annular abutting portion is located between the inner wall of the air passage of the base body and used to abut against the inner wall of the air passage of the base body, the annular shoulder portion is located between the choke member and the choke ring.

3. The switch mechanism for a pneumatic tool as claimed in claim 1, wherein an annular protrusion is formed about a periphery of the air hole and abuts against inner periphery of the annular shoulder portion of the bushing.

4. The switch mechanism for a pneumatic tool as claimed in claim 1, wherein hardness of the bushing is greater than that of the choke member.

5. The switch mechanism for a pneumatic tool as claimed in claim 1, wherein the bushing is made of metal.

6. The switch mechanism for a pneumatic tool as claimed in claim 4, wherein the bushing is made of metal.

* * * * *